United States Patent
Wang et al.

[11] Patent Number: 5,931,156
[45] Date of Patent: Aug. 3, 1999

[54] INTEGRAL HEAT-PIPE TYPE SOLAR COLLECTOR

[75] Inventors: Chih-Yao Wang; Wei-Yih Wu; Yang-Yih Hu; Tien-Yuan Li, all of Hsinchu, Taiwan

[73] Assignee: Industrial Technology Research Institute, Taiwan

[21] Appl. No.: 08/972,389

[22] Filed: Nov. 18, 1997

[51] Int. Cl.[6] ........................................ F24J 2/32
[52] U.S. Cl. .................. 126/635; 126/639; 126/640; 165/104.12; 165/104.14
[58] Field of Search .................. 126/638, 639, 126/643, 640, 655, 635; 165/109.1, 104.12, 104.14

[56] References Cited

U.S. PATENT DOCUMENTS

| | | | |
|---|---|---|---|
| 4,067,315 | 1/1978 | Fehlner et al. . | |
| 4,147,157 | 4/1979 | Zakhariya | 126/640 |
| 4,237,866 | 12/1980 | Rush | 126/639 |
| 4,291,756 | 9/1981 | Bracht | 126/643 |
| 4,416,261 | 11/1983 | van der Aa . | |
| 4,421,100 | 12/1983 | Yu . | |
| 4,438,759 | 3/1984 | Kitajima et al. . | |
| 4,513,732 | 4/1985 | Feldman, Jr. | 126/638 |
| 4,686,961 | 8/1987 | Garrison | 126/635 |
| 5,655,598 | 8/1997 | Garriss et al. | 165/104.14 |

FOREIGN PATENT DOCUMENTS

| 92755 | 6/1983 | Japan | 126/638 |
|---|---|---|---|

*Primary Examiner*—James C. Yeung
*Attorney, Agent, or Firm*—Smith, Gambrell & Russell, LLP; Beveridge, DeGrandi, Weilacher & Young Intellectual Property Group

[57] ABSTRACT

A heat-pipe type solar collector includes a heat absorber portion adapted to absorb solar energy to evaporate a working fluid in heat tube elements; and a heat release portion communicating with the heat absorber portion and having a body of a semi-annular or annular cross-section. In the daytime, the vaporized working fluid exchanges heat with objects adjacent to the heat release portion. At night when temperature drops, the working fluid flows to the heat absorber portion to allow the body of the heat release portion to generate a vacuum for heat insulating purposes, thereby maintaining the temperature in the water reservoir.

16 Claims, 6 Drawing Sheets

INTEGRAL HEAT-PIPE TYPE SOLAR COLLECTOR

BACKGROUND OF THE INVENTION

1. Field of the Invention:

The present invention relates generally to a heat-pipe type solar collector, and more particularly to an integral heat-pipe type solar collector utilizing a heat pipe as a heat conducting element.

2. Description of the Prior Art:

Using a heat pipe as a heat transfer element can quickly transfer the solar energy collected by a heat collector to a water tank, which improves the problem of slow heat transfer in conventional solar collectors that rely on natural cyclical transfer of heat.

Both U.S. Pat. No. 4,416,261 to van der Aa and U.S. Pat. No. 4,067,315 to Mahdjuri teach solar collectors. In U.S. Pat. No. 4,421,100 to Yu, a thermosyphon heat pipe hot water appliance is disclosed. In U.S. Pat. No. 4,438,759 to Kitajima et al., a heat-pipe type solar collector is described. In these prior art devices, the solar heat collected by the heat absorber portion is transferred by upper connecting tubes to the heat release portion pre-disposed in the water tank. Heat is transferred to the water in the water tank by means of heat exchange.

In prior heat-pipe type solar collectors, the higher the heat collection efficiency of the heat collector pipes is, the better the heat dissipation effects thereof. When there is not much sunlight, especially after sunset, the heat collector pipes will lose considerable heat energy so that the temperature of water in the tank drops as a result of reverse flow of heat. Therefore, it is very necessary to have a design that can maintain the temperature of the water in the tank. At present, the usual method is to coat the outer wall of the water tank with a heat insulating material. But the effect is limited. Besides, the heat insulating effect of the material will decrease with time. Furthermore, although the method of using natural convection may cause the fluid in the heat release portion to flow, the speed is very slow, and the efficiency is consequently low.

SUMMARY OF THE INVENTION

A primary object of the present invention is to provide an integral heat-pipe type solar collector to enhance instant heat collection efficiency of a solar collector so that heat transfer in the water reservoir is uniform and quick. Furthermore; the water reservoir is enveloped in a vacuum annular layer to ensure heat insulation when working fluid in the heat pipe elements does not proceed with the heat exchange process, thus reducing loss of heat in the water reservoir.

Another object of the present invention is to provide a heat-pipe type solar collector that may be directly connected to a pipe to heat a fluid in the pipe. The solar collector may also be adapted to envelop existing pipes.

The integral heat-pipe type solar collector of the present invention comprises a heat absorber portion and a heat release portion. The heat absorber portion includes a plurality of inter-communicating tube elements or plate elements, and heat collector elements connected to the tube elements. The heat release portion includes a body communicating with the tube elements and having an annular cross-section. The body, which is preferably ring-shaped, is comprised of concentric inner and outer tubes, surrounded by a heat insulating element. The inner tube may be a water reservoir or a fluid duct. The heat release portion is located at an upper end of the heat absorber portion. The heat release portion and the heat absorber portion are directly coupled to form a low-pressure vacuum enclosed container. Preferably, the enclosed container is filled with a suitable amount of working fluid after it has been made vacuum and is then sealed.

Preferably, the present invention utilizes the phase change latent heat of the working fluid to transfer heat so as to be able to operate cyclically with the help of gravity, thus accomplishing the object of absorbing and accumulating solar heat. An intelligent type turbulence stimulator is disposed in the water reservoir to create in the reservoir turbulent water flows to exchange heat with vaporized working fluid in the heat release portion of the heat collector so as to enhance the instant heat collection efficiency. The turbulence stimulator provides appropriate turbulence depending on the amount of heat exchange required by the solar collector. The turbulence stimulator obtains its power supply from solar cells and does not require additional electric power. By means of this arrangement, scale formation in the heat release portion can be avoided and life of the solar collector prolonged.

The annular body of the heat release portion according to the present invention has vacuum, heat insulating effects. In other words, at night when the temperature drops, the working fluid will flow downwardly to the heat absorber portion and will not stay in the heat release portion. (Since the working fluid in the heat pipe does not circulate anymore, the heat will not be transferred to the heat absorber portion.) A vacuum is therefore formed in the heat release portion. Thus, the present invention is capable of maintaining the temperature of water in the reservoir and avoiding reverse flow of heat in the reservoir.

Preferably, the heat release portion defined by the annular body may be fitted on a fluid duct. The heat release portion has two ends, each of which is provided with threads so that the heat release portion can be directly connected to the fluid duct. Alternatively, the heat release portion is comprised of first and second halves of semi-annular cross-section connected respectively to first and second heat absorber portions. The first and second halves of the heat release portion are butt joined to form a tubular structure for enveloping the fluid duct and heating the fluid in the fluid duct.

BRIEF DESCRIPTION OF THE DRAWINGS

The foregoing and other features and advantages of the present invention will be more clearly understood from the following detailed description and the accompanying drawings, in which.

FIG. 6 and FIG. 7 are similar to FIG. 1, but showing two different embodiments, in which FIG. 6 is a perspective exploded view.

DETAILED DESCRIPTION OF THE PREFERRED EMBODIMENTS

Figure 1:
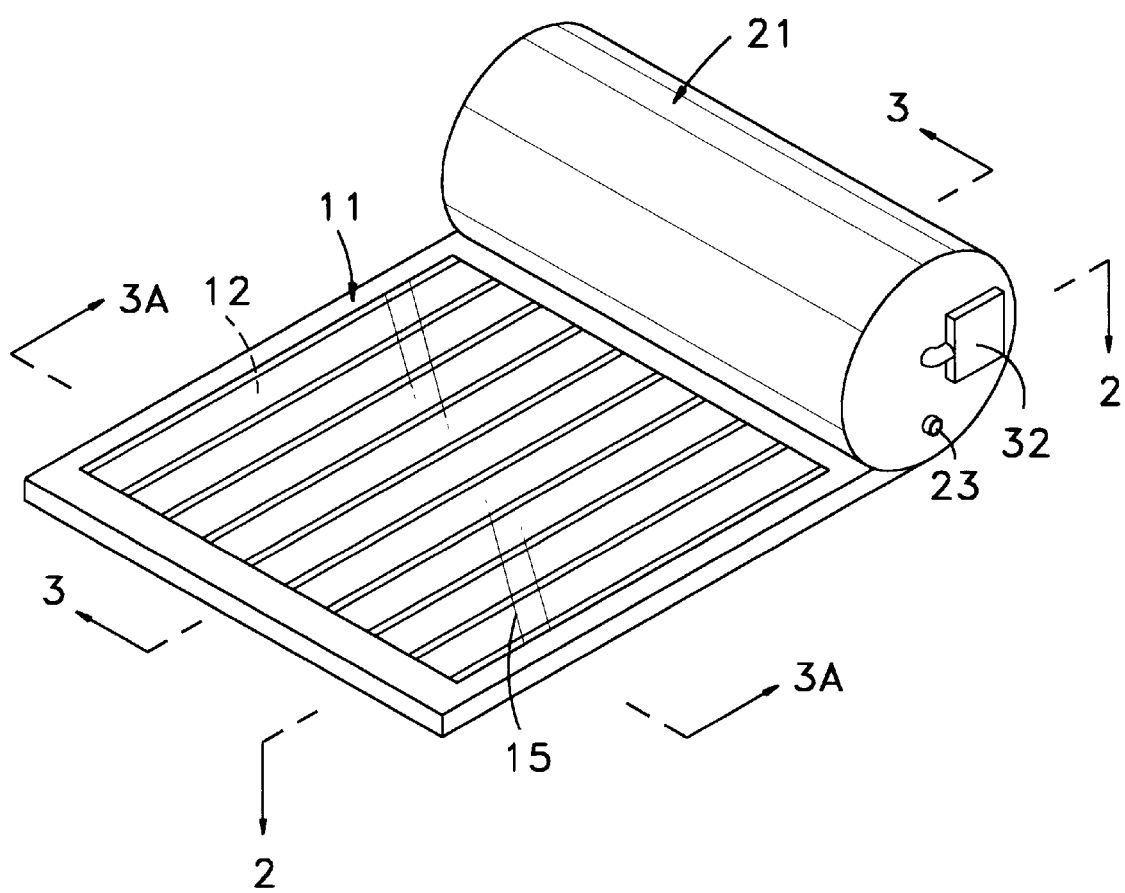
FIG. 1 is a perspective schematic view of the structure of an embodiment of the heat-pipe type solar collector according to the present invention.
Figure 2:
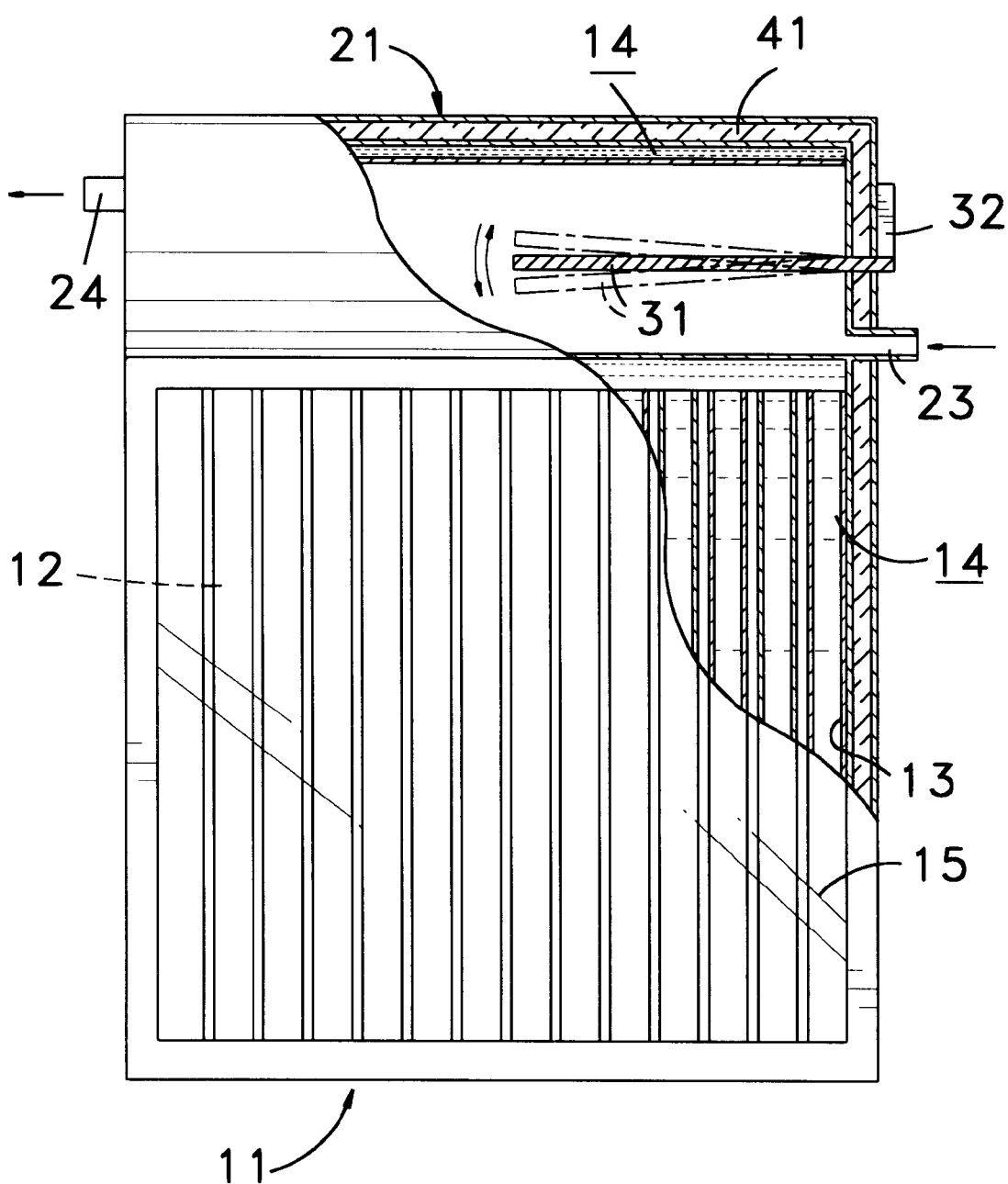
FIG. 2 is a sectional view taken along line 2—2 of FIG. 1.
Figure 3:
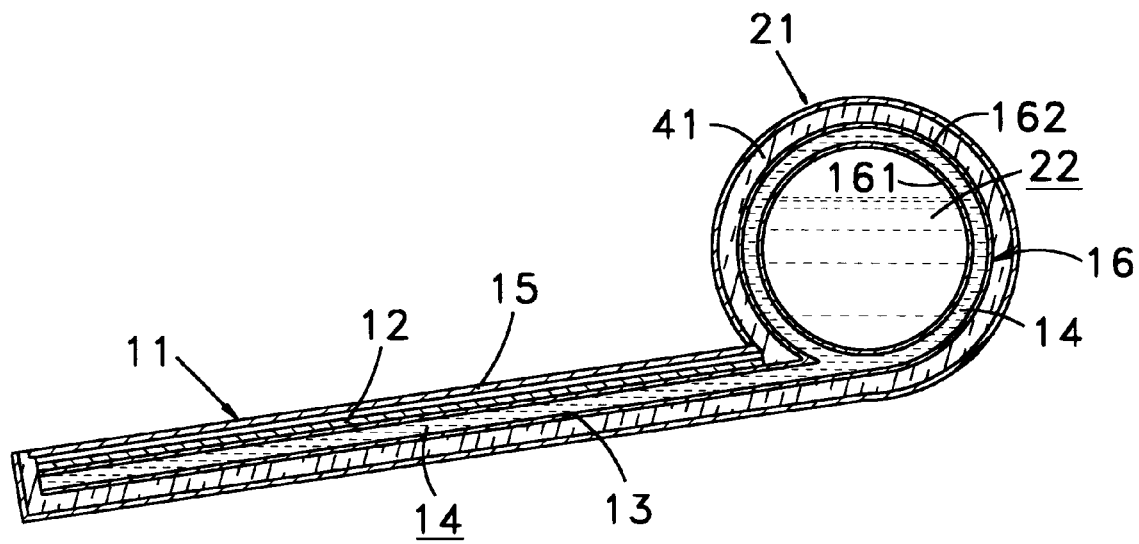
FIG. 3 is a sectional view taken along line 3—3 of FIG. 1.
Figure 3A:
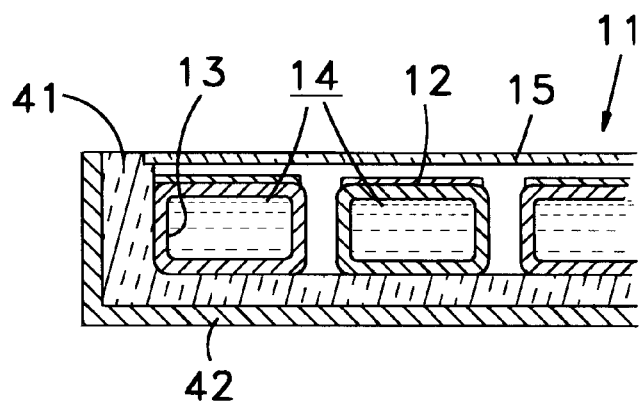
FIG. 3A is a partially sectional view taken along line 3A—3A of FIG. 1.

With reference to FIGS. 1–3 and FIG. 3A, the integral heat-pipe type solar collector according to the present invention essentially comprises a heat absorber portion 11 and a heat release portion 21. As shown in FIG. 2 and FIG. 3a, the heat absorber portion 11 includes a plurality of intercommunicating tube elements 13 or plate elements, constituting channels for a working fluid 14, and a heat collector element 12 connected to the tube elements 13. As shown in FIG. 3, the heat release portion 21 includes a body 16 having an annular cross-section and connected to the tube elements 13. The body 16 is comprised of concentrically arranged inner tube 161 and outer tube 162, surrounded on the outside by a heat insulating element 41. The inner tube 161 can serve as a reservoir or a fluid duct. The heat release portion 21 is located above an upper end of the heat absorber portion 11, and both are directly coupled to form a low-pressure vacuum enclosed container.

The heat release portion 21, as shown in FIG. 3, is an enclosed region having an annular cross-section. It is surrounded on the outside by the heat insulating element 41 (such commonly used heat insulating materials as foamed PU for preventing heat loss). The heat absorber portion 11 includes a glass plate 15 at an upper end. It may also be provided with the heat insulating element 41. The tube elements 13 are disposed on the heat insulating element 41, which is surrounded by an outer frame 42 at a lower end thereof. After the enclosed inner container has been placed under vacuum and low-pressure, it is filled with a suitable amount of the working fluid 14 and sealed. There is only working fluid inside the enclosed inner container. The working fluid 14 may be methanol, acetone, water, or refrigerant, depending on the actual situation. The region surrounded by the middle of the inner tube 161 of the heat release portion 21 may be a reservoir or, preferably, a hollow water duct 22 having a water inlet 23 and a water outlet 24. The left and right side covers of the water duct 22 are heat insulating. An intelligent type electric turbulence stimulator 31 is disposed in the proximity of the water inlet 23 to create turbulence in the direction of the water outlet. The turbulence stimulator 31 obtains its power supply from small-size solar cells.

After the heat collector element 12 of the heat absorber portion 11 has absorbed solar energy, the energy will heat the working fluid 14 in the tube elements 13 until it evaporates into vapor, causing the pressure of the vaporized working fluid to rise. The stream of vaporized working fluid flows along the interior of the tube elements 13 and upwardly towards the heat release portion 21 where pressure is lower. Utilizing the pressure difference as the driving force overcomes gravity. The streams of vapor in all the tube elements 13 converge at the heat release portion 21. Furthermore, the vaporized working fluid rises to the condensation end located at a higher level and quickly and uniformly disperse to the entire region of the annular body 16, releasing heat to the reservoir or fluid duct. Since the heat release portion 21 is externally heat insulated, the heat released when the vapor condenses will be transferred to the reservoir or fluid duct so that the water temperature rises. After condensation, the liquid working fluid in the heat release portion 21 flows back to the heat absorber portion 11 along the original pathway due to gravity. The cycles of solar heat absorption, evaporation, and condensation are repeated until the difference in temperature between the working fluid 14 in the tube elements 13 of the heat absorber portion 11 and the fluid in the reservoir or fluid duct at the center of the heat release portion 21 reaches a lowest point. In sum, the integral heat-pipe type solar collector according to the present invention uses the latent heat of the working fluid at phase change to achieve fast heat transfer of solar energy absorbed by the heat absorber portion to the reservoir or fluid duct to cause the water temperature to rise. Certainly, the inner surface of the heat release portion 21 of the present invention may be processed into various kinds of enhanced heat transfer surfaces to provide larger heat transfer areas so as to raise the efficiency of heat release and condensation of the working fluid during operation, and to increase the instant efficiency of the solar collector. All of these are considered details encompassed by the claims of the present invention.

In addition, the intelligent type turbulence stimulator 31 disposed in the reservoir creates turbulence inside the reservoir so that heat exchange is carried out between turbulent flows of water in the reservoir and vapor at the heat release portion 21. Since the turbulence stimulator 31 obtains its power supply from the solar cells plate 32, electric potential of different magnitude may be generated depending on different amounts of sunlight. Therefore, when there is more solar heat, and the heat release portion 21 needs to quickly and efficiently proceed with heat exchange of a larger amount of energy, the turbulence stimulator 31 can provide great turbulence flows to enhance the instant efficiency of the entire solar collector. On the other hand, when there is little sunlight or when it is night time, the turbulence stimulator 31 will generate a relatively small turbulence or will not work at all so as to avoid possible dissipation of heat. Therefore, the turbulence stimulator 31 of the present invention can on its own provide an appropriate turbulence flow depending on the state of heat exchange in the solar collector. Hence, scale formation is avoided. In sum, the turbulence stimulator 31 of the present invention is truly an intelligent device.

Figure 4:
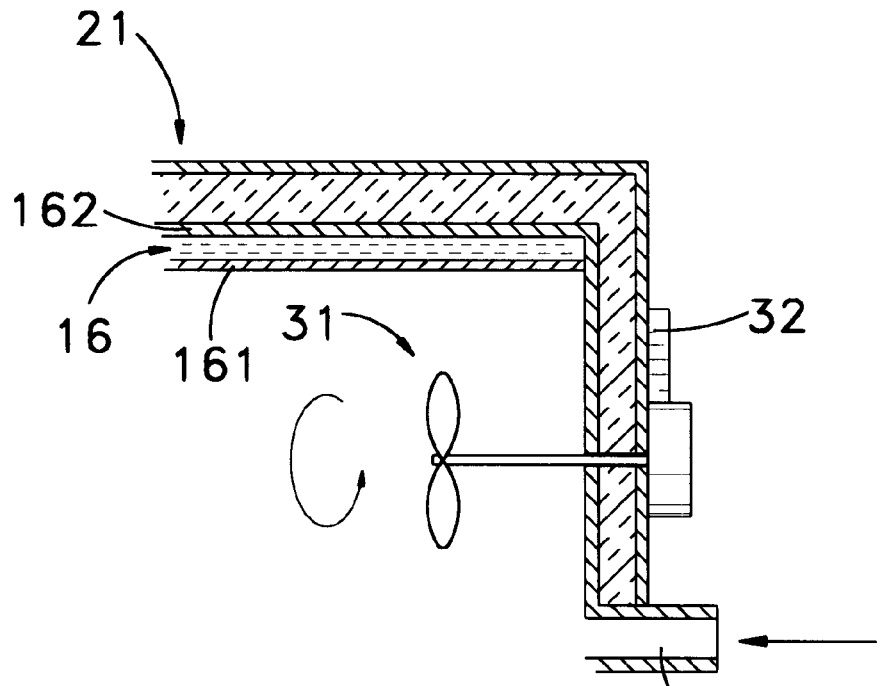
FIG. 4 and FIG. 5 illustrate different embodiments of the turbulence stimulator in the heat-pipe type solar collector of the present invention.
Figure 5:
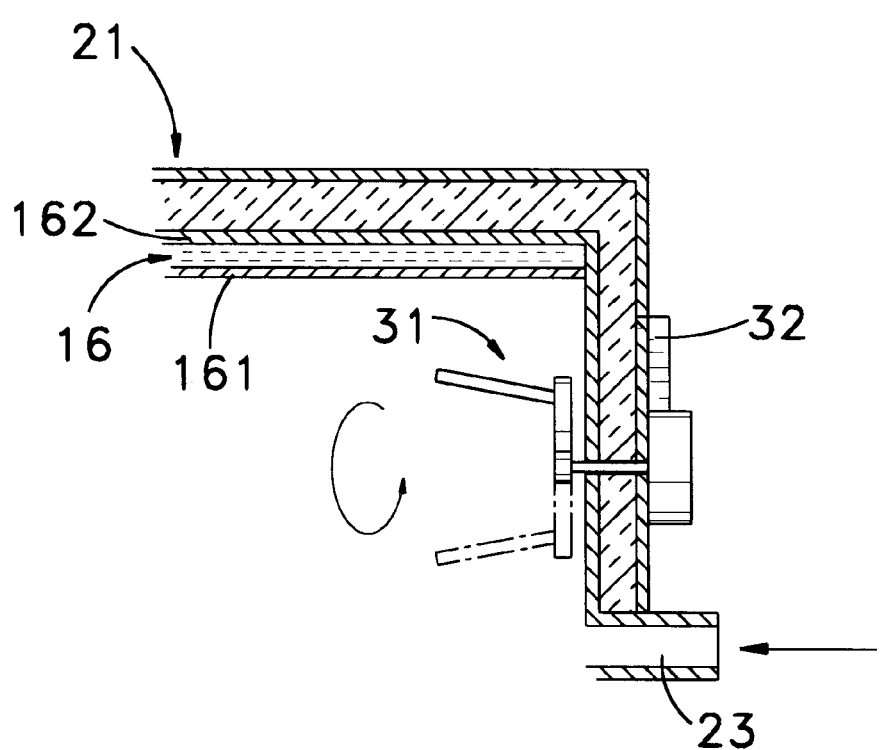

The above-described turbulence stimulator 31 has various embodiments. Preferably, it can be a vibrating plate as shown in FIG. 2, a motor-driven propeller as shown in FIG. 4, or a paddle linked-up with an eccentric plate as shown in FIG. 5. Certainly, there are other equivalent elements that can be used.

Figure 6:
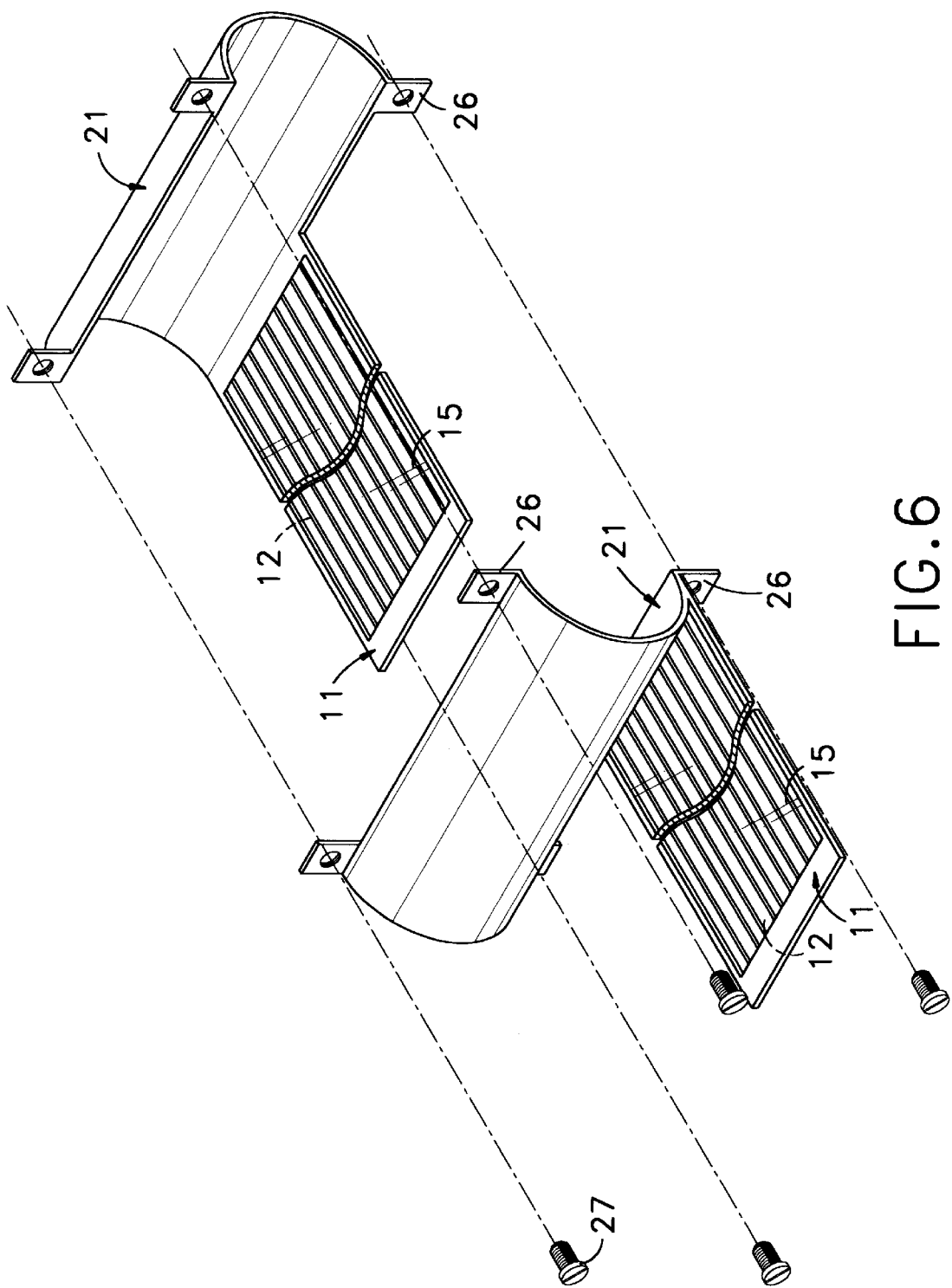
Figure 7:
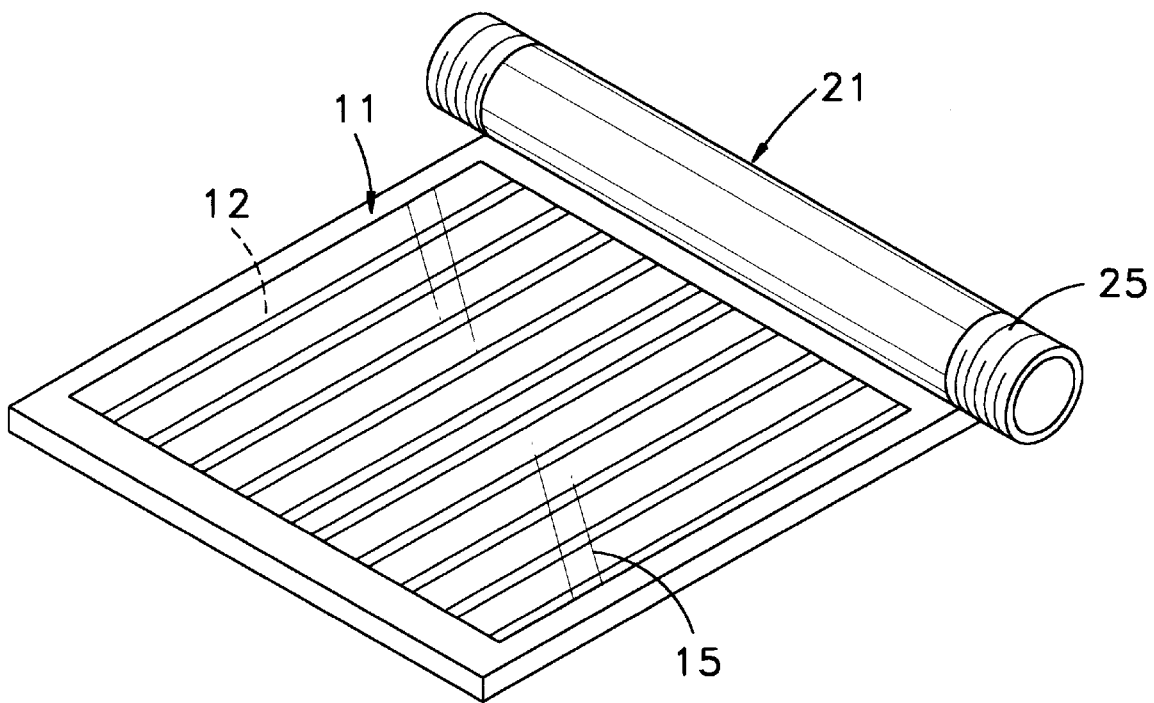

In one preferred embodiment, the above-described heat release portion 21 may be a tube structure as shown in FIG. 7. Each end of the heat release portion 21 is provided with a coupler 25 that may be provided with threads, so that the tubular heat release portion 21 may become a tube element for connecting a water pipe and heating the water flowing through the water pipe. Alternatively, the inner tube 161 of the tube heat release portion 21 is directly sleeved onto conventional pipes. FIG. 6 shows another alternative. The heat release portion 21 is divided into two tube halves of a semi-circular cross-section, i.e., a first heat release portion and a second heat release portion. First and second heat release portions may be assembled into a tube. Each heat release portion defines a semi-annular working fluid path and is still integrally connected to a first or second heat absorber portion 11. The first and second heat release portions respectively have opposed mounting plates 26 that may be locked using screws 27. If necessary, bolts can be used to lock the heat absorber portions of the first and second heat release portions together in juxtaposition. The structure in this embodiment can be used to enclose old pipes. On the whole, this embodiment includes a first heat absorber portion adapted to absorb solar energy to evaporate the working fluid in the tube elements; and a first heat release portion communicating with the heat absorber portion and defining a first semi-annular path, with its inner side orienting to the back; a second heat absorber portion adapted to absorb solar energy to evaporate the working fluid in the tube elements; and a second heat release portion communicating with the heat absorber portion and defining a second semi-annular path, with its inner side orienting to the front. By arranging the first and second heat absorber portions in juxtaposition, the first and second semi-annular paths form an annular path for holding a fluid pipe so that heat exchange can proceed between vaporized working fluid and fluid in the fluid duct. Certainly, these examples are only used to illustrate that there are many possible modifications to the integral heat-pipe type solar collector of the present invention. It should be particularly noted that different leakage-proof members have to be utilized to avoid leakage of fluid, and the leakage proof members should preferably be heat insulating.

The advantages of the present invention that employs an integral heat pipe in conjunction with an intelligent type turbulence stimulator 31 are as follows:

(1) Unidirectional heat flow reduces heat loss at night or on cloudy or rainy days. This is because when the integral heat pipe does not operate at night or on cloudy or rainy days, the fluid duct 22, i.e., the heat release portion 21 in the reservoir, is in a lowpressure vacuum state, and the working fluid does not proceed with the heat exchange process, hence the problem of reverse flow in conventional solar collectors will not occur. Besides, the present invention have double heat insulating effects.

(2) The working fluid in the solar collector of the present invention does not form scale on or corrode the walls of the tubes. This not only eliminates the problem of scaling or corrosion in the tubes of conventional solar collectors in which cold water is heated directly, but due to the special design of the annular heat release portion 21 of the present invention that achieves uniform heat transfer, the distribution of water temperature in the water duct 22 is very even, thus avoiding the occurrence of high temperature in certain parts of the heater. Besides, the arrangement of the intelligent type turbulence stimulator 31 improves the problem of scale formation on the outer walls of the heat release portion, which will inevitably happen in conventional separate type heat-pipe type solar collectors.

(3) The integral type heat release portion 21 cooperates with the intelligent type turbulence stimulator 31 to ensure that the water temperature in the water duct 22 is evenly distributed, so that the position of the water outlet of the water duct 22 may change depending on actual needs and is not required to be positioned at a certain height as in the conventional solar collectors.

(4) The present invention is easy to install and dismount, as well as convenient to clean.

(5) The present invention is energy-saving as the turbulence stimulator does not require additional electric power supply.

Although the present invention has been illustrated and described with reference to the preferred embodiments thereof, it should be understood that it is in no way limited to the details of such embodiments, but is capable of numerous modifications within the scope of the appended claims.

What is claimed is:

1. A heat-pipe type solar collector, comprising:
    a heat absorber portion and a heat release portion, said heat absorber portion including a plurality of inter-communicating tube elements or plate elements, and a heat collector element coupled on said heat absorber portion; said heat release portion including a body in annular cross-section communicating with said tube or plate elements, said body including concentric inner and outer tubes, wherein said inner tube is a water reservoir having a water inlet and a water outlet, a turbulence stimulator, for generating a turbulent water flow, provided in the water reservoir, and wherein said heat absorber and release portions are coupled to form a low-pressure enclosed container.

2. A heat-pipe type solar collector as defined in claim 1, wherein said turbulence stimulator is driven by electric energy provided by solar cells.

3. A heat-pipe type solar collector as defined in claim 1, wherein said turbulence stimulator is a propeller.

4. A heat-pipe type solar collector as defined in claim 1, wherein said turbulence stimulator is a vibrator.

5. A heat-pipe type solar collector as defined in claim 1, wherein said turbulence stimulator is a paddle driven by an eccentric shaft.

6. A heat-pipe type solar collector as defined in claim 1, wherein said heat release portion is a short tube having a coupler at either end adapted to be connected to a water pipe.

7. A heat-pipe type solar collector as defined in claim 1, wherein said heat release portion is provided with a heat insulating element at its outer periphery, and said heat absorber portion is surrounded by a heat insulating element except at its top side, said heat insulating element of said heat absorber portion having said tube elements disposed on its upper side, and being enveloped by an outer frame at a lower side.

8. A heat-pipe type solar collector as defined in claim 1, wherein said heat release portion is located higher than said heat absorber portion.

9. A heat-pipe type solar collector as defined in claim 1, wherein said inner tube is formed as a fluid duct.

10. A heat-pipe type solar collector as defined in claim 1, wherein said inner tube is capable of enveloping a fluid duct.

11. A heat-pipe type solar collector as defined in claim 1, wherein the water inlet of the water reservoir is located in a lower half of the inner tube and the water outlet of the water reservoir is located in an upper half of the inner tube.

12. A heat-pipe type solar collector as defined in claim 1, wherein the turbulence stimulator is located proximate to the water inlet of the water reservoir.

13. A heat-pipe type solar collector, comprising: a first heat absorber portion, including a plurality of first heat tube elements adapted to absorb solar energy to evaporate a working fluid in the first heat tube elements; and a first heat release portion communicating with said first heat absorber portion and forming a first semi-annular body with a concave portion thereof facing away from the first heat absorbing portion;
    a second heat absorber portion, including a plurality of second heat tube elements adapted to absorb solar energy to evaporate the working fluid in the second heat tube elements; and a second heat release portion communicating with said second heat absorber portion and forming a second semi-annular body with a concave portion thereof facing toward the second heat absorbing portion; whereby said first and second heat absorber portions are juxtaposed such that said first and second semi-annular bodies together form an annular tube for holding a fluid duct so that heat exchange between vaporized working fluid and a fluid in said fluid duct can proceed.

14. A heat-pipe type solar collector as defined in claim 13, wherein said first and second heat absorber portions have heat collector elements.

15. A heat-pipe type solar collector as defined in claim 13, wherein said first and second tube elements are provided with heat collector elements.

16. A heat-pipe type solar collector as defined in claim 15, wherein said heat collector elements are heat collecting plates.

* * * * *